UNITED STATES PATENT OFFICE.

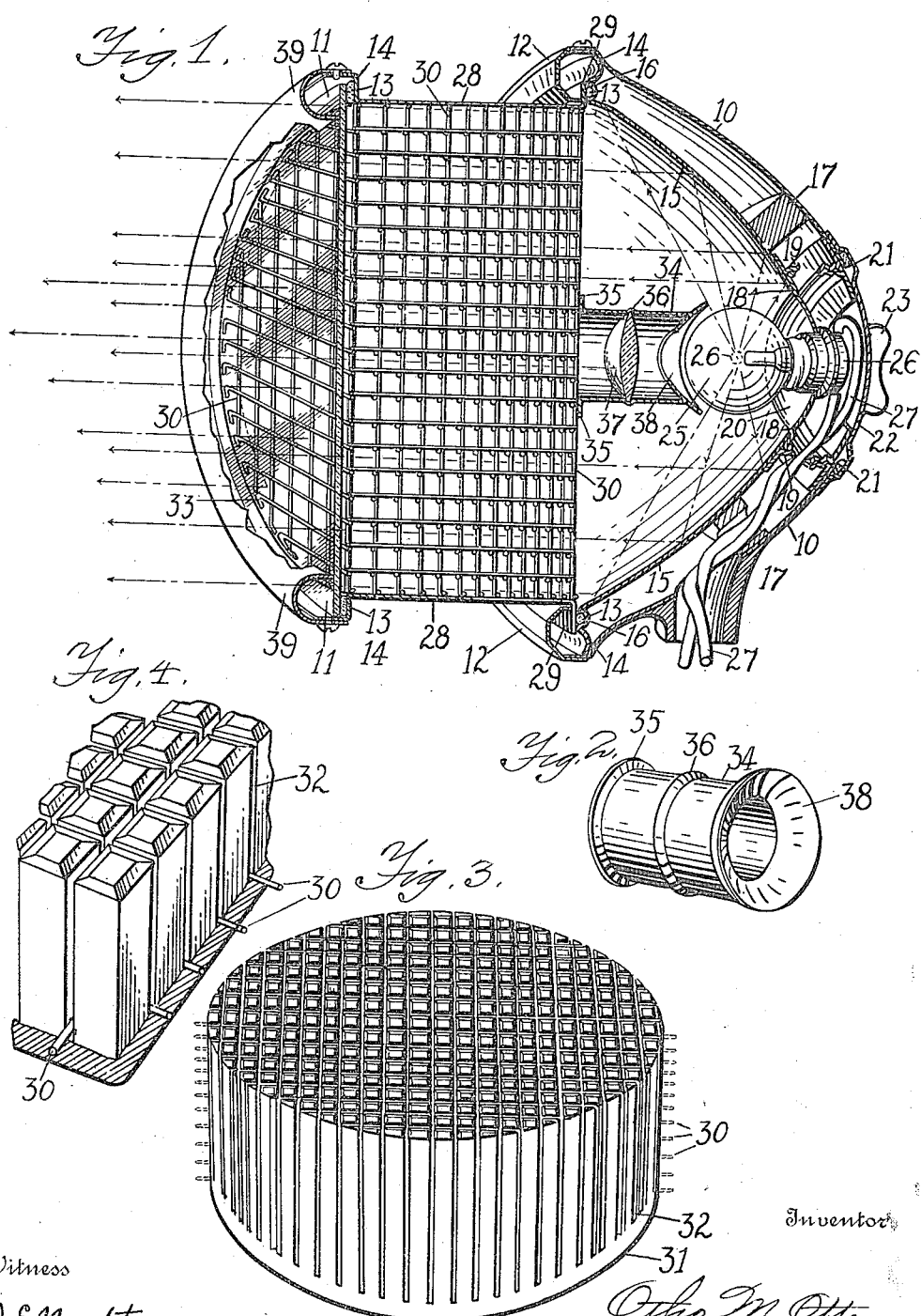

OTHO M. OTTE, OF JAMESTOWN, NEW YORK.

AUTOMOBILE-LAMP.

1,260,440.　　　　Specification of Letters Patent.　　Patented Mar. 26, 1918.

Application filed July 17, 1917. Serial No. 180,997.

*To all whom it may concern:*

Be it known that I, OTHO M. OTTE, citizen of the United States, residing at the city of Jamestown, in the county of Chautauqua and State of New York, have invented certain new and useful Improvements in Automobile-Lamps, of which the following, taken in connection with the accompanying drawings, is a specification.

The invention relates to lamps for vehicles and similar constructions wherein it is desired to throw the light to a distance; and the object of the improvement is, first, to provide a lamp with a compound parabolic shaped reflector in which the light emitted from the lamp is projected in one direction, being controlled by the conformation of said compound reflector and a lens and complementary reflector within said compound parabolic shaped reflector; and second, to provide a vision protecting screen of several series of intercrossing wires which form parallel tubular openings for the parallel rays of light which form the light shaft; third, to provide a tubular holder for said lens and a complementary ring reflector on said vision protecting screen of wire in front of the lamp; and fourth, to provide means for the quick and easy assemblage of said intercrossing wires which form said vision protecting screen; and the invention consists in the novel features and combinations hereinafter set forth and claimed.

In the drawings, Figure 1 is a vertical diametral sectional view of the lamp from front to rear showing the construction and arrangement of the different parts and their relation to one another with the wire vision protecting screen in the front cylindrical portion of the lamp, and the tubular holder for the lens and ring reflector on said vision protecting screen. Fig. 2 is a perspective view of the tubular holder for the lens showing the complementary ring reflector on the rear end of the same. Fig. 3 is a perspective view of the slotted assembling block for the spaced intercrossed wires which form the vision protecting screen, showing the wires extending out therefrom in dotted line before bending for attachment within the tubular holder for said vision protecting screen; and Fig. 4 is a perspective view of a portion of the assembling block showing the preferred manner of slotting the same and also showing the wires extending beyond the sides of the block.

Like characters of reference refer to corresponding parts in the several views.

The numeral 10 designates the outer shell or casing of an ordinary parabolic shaped automobile lamp, which casing is preferably made of thin sheet metal and has a large open front which is, as normally constructed, closed by a glass 11, which glass is held in place by a rim 12, preferably with a rubber gasket 13 beneath the same and between said glass and the spacing flange 14.

A spacing flange 14 is formed around the outwardly turned edge of the inner reflector shell 15, an annular groove 16 being provided in the flange 14 to receive the gasket 13 therein. The flange 14 holds the shell or outer casing 10 in spaced relation to the inner reflector shell 15, and the two shells 10 and 15 are made in substantially the same parabolic shape, the shell 15 being sufficiently smaller to permit being held in spaced relation within the outer shell 10 by means of the flange 14 at the front and the spacing ring 17 between said shells near the rear portion, thereby supporting all the parts of the lamp firmly in position.

The central portion or rear end of the parabolic reflector 15 has an opening 18 therein surrounded by a curved flange 19 into which a small reflector 20 is inserted by being sprung into the curved flange 19 thereby holding the reflector 20 firmly in position upon and so related to the parabolic reflector 15 that while it is of a higher curvature and thereby forms a compound parabolic reflector of the two reflectors 15 and 20, yet it also closes the opening 18 in such a manner as to be substantially continuous with the parabolic reflector 15.

A slightly larger opening 21 is provided in the rear end of the casing 10 through which the small reflector 20 may be inserted, which opening 21 is closed by means of a screw cap 22 which has a handle 23 for turning the cap into the screw thread provided in the casing 10 around the opening 21. It is apparent that the screw cap 22 may be easily removed by unscrewing the same thereby opening an approach to the reflector 20 for the adjustment and repair of the same.

An electric lamp 25 is mounted in a lamp holder 26 in the center of the small reflector 20 and has the connecting wires 27 leading to the source of electrical energy. The electric lamp 25 when mounted in the holder 26 is so adjusted in relation to the reflectors 15 and 20 that the center of the light in the lamp 25 is at that point which will be best reflected by the two reflectors in their relation to each other. The curves of both the reflectors 15 and 20 are such that substantially all the rays of light are reflected in parallel lines thereby projecting a strong beam of light upon the roadway in front of the vehicle.

In order to protect the vision of the bystander or passerby from the dazzling glare of the lamp, a removable or detachable vision protecting screen is provided which consists of the three series of intercrossed wires 30 in the sheet metal cylinder 28. The cylinder 28 has the flange 29 for attachment of the screen to the lamp by means of the rim 12 in place of the glass 11 which is usually held by said rim 12. The glass 11 is placed in front of the cylinder 28 and held there by means of a rim 39 similar to rim 12, which is partially broken away.

The interior of the cylinder 28 is filled with three intercrossing series of horizontal and vertical wires which cross one another in spaced relation thereby forming square or rectangular spaces between said wires, said series of wires being spaced gradually nearer to one another as they draw nearer the light 26 to increase the tubular effect.

The wires 30 are arranged in the intercrossed spaced relation by means of an assembling block 31, which assembling block has the slots 32 extending nearly through said block 31 at substantially right angles. The wires 30 are received in the slots 32 in the desired spaced relation to one another and intercrossing one another and extend slightly beyond said block in order that, after the wires are inserted, it may be turned against a straight edge thereby turning the extended wire ends into the circular form shown at 33 in Fig. 1. The entire screen is then dipped in solder thereby fixing all the wires in their intercrossed relation to one another. When the ends 33 of the wires 30 are turned the wire core fits closely within the tube 28 and is attached thereto, thereby providing square or rectangular apertures through which the light is freely reflected.

The light is further reflected and protected by a short tube 34 which is attached to the inner side of the wire screen in front of the lamp 25 by means of a flange 35. The tube 34 has an annular groove 36 which receives therein the refracting lens 37. The tube 34 also bears on its inner end the complementary ring refractor 38 which aids the small reflector 20 in so controlling the light as to project the light rays through the tube 34 and lens 37, being refracted by said lens 37 into parallel alinement with the remaining rays of light.

It is obvious that the vision protecting screen formed by the spaced series of intercrossed wires provides an exceedingly simple construction which is easily constructed at low cost and attached to the lamp, thereby providing a strong and durable screen construction which can be attached easily and quickly to the common forms of automobile lamps.

The spaced wires 30 of the vision protecting screen in their series relation to one another form, as it were, tubular openings in the interstices therethrough from front to rear through which the light is freely reflected, the only obstruction being the small wires of which the screen is constructed.

I claim as new:—

1. In combination with an automobile lamp, a screen composed of a cylinder flanged at its inner end, means to secure said flange to the lamp, so that the cylinder projects outwardly from the front face of the lamp, a series of vertical spaced wires in the cylinder extending throughout the length and area thereof, a series of longitudinal horizontal wires also extending throughout the length and area of the cylinder, and a series of transverse horizontal wires extending throughout the length and area of the cylinder.

2. In combination with an automobile lamp, a screen composed of a cylinder flanged at its inner end, means to secure said flange to the lamp, so that the cylinder projects outwardly from the front face of the lamp, a series of vertical spaced wires in the cylinder extending throughout the length and area thereof, a series of longitudinal horizontal wires also extending throughout the length and area of the cylinder, and a series of transverse horizontal wires extending throughout the length and area of the cylinder, each wire having each of its free ends turned at an angle and secured to the inner circumference of the cylinder.

3. In combination with an automobile lamp, a screen composed of a cylinder flanged at its inner end, means to secure said flange to the lamp, so that the cylinder projects outwardly from the front face of the lamp, a series of vertical spaced wires in the cylinder extending throughout the length and area thereof, a series of longitudinal horizontal wires also extending throughout the length and area of the cylinder, a series of transverse horizontal wires extending throughout the length and area of the cylinder, a tube secured to the rearmost of the vertical and horizontal wires, and a lens in the tube.

4. In combination with an automobile lamp, a screen composed of a cylinder, means to secure said cylinder to the lamp so that the cylinder projects outwardly from the front face of the lamp, a series of vertical spaced wires in the cylinder extending throughout the length and area thereof, a series of longitudinal wires in the cylinder extending throughout the length and area thereof, and a series of transverse wires in the cylinder throughout the length and area thereof.

5. In combination with an automobile lamp, a screen composed of a cylinder, means to secure said cylinder to the lamp, a series of vertical spaced wires in the cylinder extending throughout the length and area thereof, a series of longitudinal wires in the cylinder extending throughout the length and area thereof, and a series of transverse wires in the cylinder extending throughout the length and area thereof.

6. In combination with an automobile lamp, a screen composed of a cylinder, means to secure said cylinder to the lamp, a series of vertical spaced wires in the cylinder extending throughout the length and area thereof, a series of longitudinal wires in the cylinder extending throughout the length and area thereof, and a series of transverse wires in the cylinder extending throughout the length and area thereof, a tube secured to the rearmost of the wires and projecting into the lamp, and a lens in the tube.

In testimony whereof I have affixed my signature in the presence of two witnesses.

OTHO M. OTTE.

Witnesses:
H. A. SANDBERG,
R. V. CONNER.